(12) United States Patent
Wang et al.

(10) Patent No.: US 9,447,948 B2
(45) Date of Patent: Sep. 20, 2016

(54) LED LIGHTING APPARATUS WITH FLEXIBLE LIGHT MODULES

(71) Applicant: TSMC Solid State Lighting Ltd., Hsinchu (TW)

(72) Inventors: Jin-Hua Wang, Xinzhuang (TW); Hsueh-Hung Fu, HsinChu (TW); Pei-Wen Ko, Zhubei (TW); Chih-Hsuan Sun, Kaohsiung (TW)

(73) Assignee: EPISTAR CORPORATION, Hsinchu (TW)

( * ) Notice: Subject to any disclaimer, the term of this patent is extended or adjusted under 35 U.S.C. 154(b) by 147 days.

(21) Appl. No.: 14/224,891

(22) Filed: Mar. 25, 2014

(65) Prior Publication Data

US 2014/0198499 A1     Jul. 17, 2014

Related U.S. Application Data

(63) Continuation of application No. 13/326,766, filed on Dec. 15, 2011, now Pat. No. 8,702,278.

(51) Int. Cl.

| F21V 29/00 | (2015.01) |
|---|---|
| F21V 17/02 | (2006.01) |
| F21K 99/00 | (2016.01) |
| F21V 5/00 | (2015.01) |
| F21V 29/74 | (2015.01) |
| F21V 29/75 | (2015.01) |
| F21V 29/76 | (2015.01) |
| F21V 13/04 | (2006.01) |
| F21W 131/103 | (2006.01) |

(Continued)

(52) U.S. Cl.
CPC ................ *F21V 17/02* (2013.01); *F21K 9/30* (2013.01); *F21K 9/50* (2013.01); *F21V 5/007* (2013.01); *F21V 29/004* (2013.01); *F21V 29/74* (2015.01); *F21V 29/75* (2015.01); *F21V 29/763* (2015.01); *F21V 13/04* (2013.01); *F21W 2131/103* (2013.01); *F21Y 2101/02* (2013.01); *F21Y 2113/00* (2013.01); *Y02B 20/72* (2013.01)

(58) Field of Classification Search
CPC ............ F21K 9/30; F21K 9/50; F21K 99/00; F21V 29/763; F21V 17/02; F21V 29/004; F21V 29/74; F21V 29/75; F21V 5/007; F21V 29/2206; F21V 13/04; F21V 5/00; Y02B 20/72; F21W 2131/103; F21Y 2113/00
See application file for complete search history.

(56) References Cited

U.S. PATENT DOCUMENTS

| 8,066,404 B2 * | 11/2011 | Song et al. ............. F21S 2/005 257/722 |
|---|---|---|
| 8,075,152 B2 | 12/2011 | Chen et al. |
| 8,267,544 B2 | 9/2012 | Zheng et al. |

(Continued)

*Primary Examiner* — Y M Lee

(74) *Attorney, Agent, or Firm* — Muncy, Geissler, Olds & Lowe, P.C.

(57) ABSTRACT

The present disclosure involves a street light. The street light includes a base, a lamp post coupled to the base, and a lamp head coupled to the lamp post. The lamp head includes a housing and a plurality of LED light modules disposed within the housing. The LED light modules are separate and independent from each other. Each LED light module includes an array of LED that serve as light sources for the lamp. Each LED light module also includes a heat sink that is thermally coupled to the LED. The heat sink is operable to dissipate heat generated by the LED during operation. Each LED light module also includes a thermally conductive cover having a plurality of openings. Each LED is aligned with and disposed within a respective one of the openings.

20 Claims, 11 Drawing Sheets

(51) Int. Cl.
*F21Y 101/02* (2006.01)
*F21Y 113/00* (2016.01)

(56) References Cited

U.S. PATENT DOCUMENTS

| | | |
|---|---|---|
| 2008/0078524 A1 | 4/2008 | Wilcox et al. |
| 2009/0196037 A1* | 8/2009 | Xiao et al. ............. F21V 21/30 362/249.03 |
| 2009/0251906 A1 | 10/2009 | Liu et al. |
| 2009/0303712 A1* | 12/2009 | Wung et al. ............. F21K 9/00 362/234 |
| 2010/0103668 A1 | 4/2010 | Lueken et al. |
| 2010/0238658 A1 | 9/2010 | Xiang et al. |
| 2010/0254148 A1 | 10/2010 | Huang et al. |
| 2010/0265709 A1 | 10/2010 | Liu |
| 2011/0038154 A1 | 2/2011 | Chakravarty et al. |
| 2011/0075421 A1 | 3/2011 | Lai |

* cited by examiner

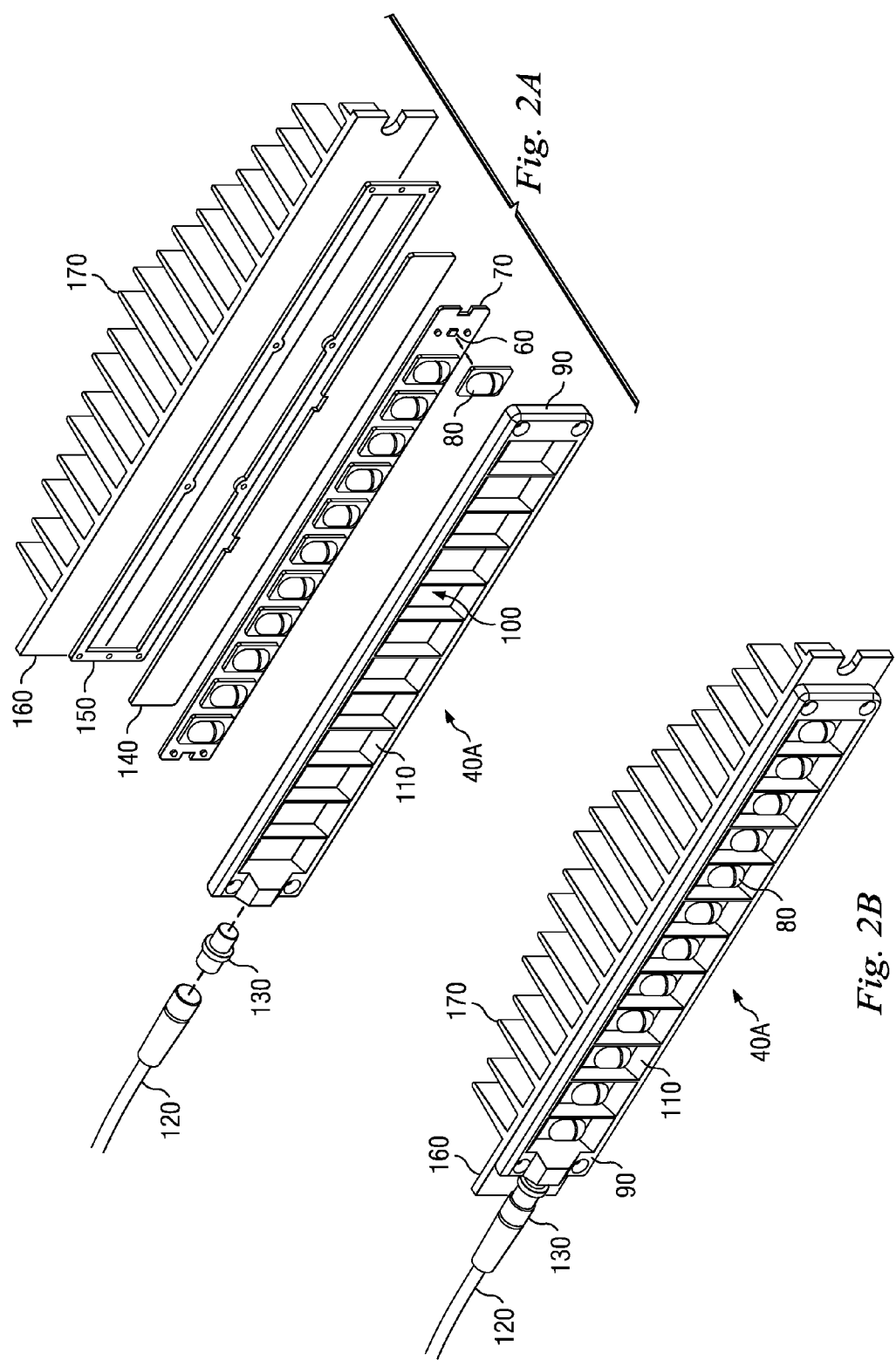

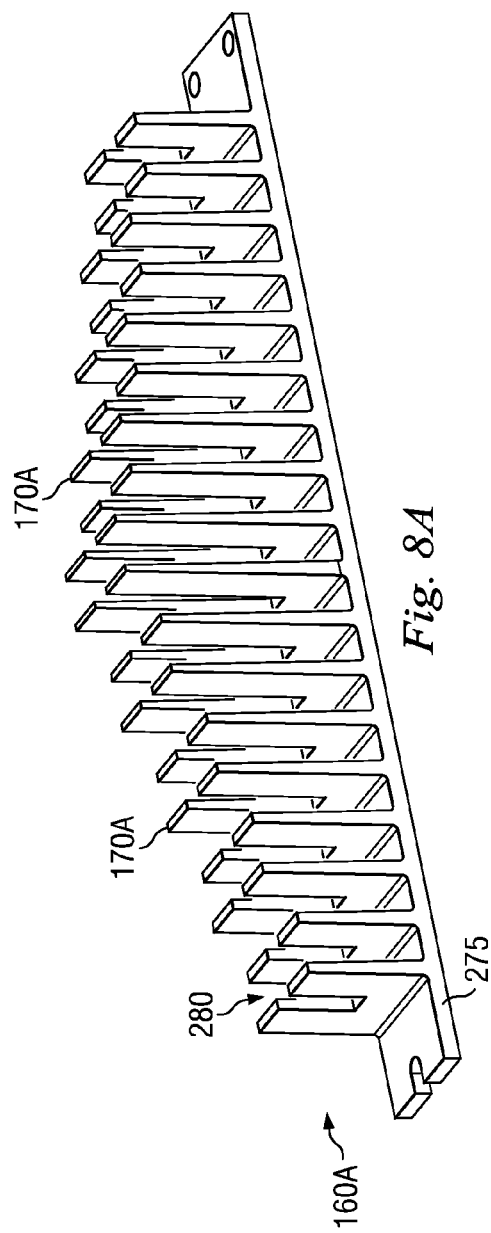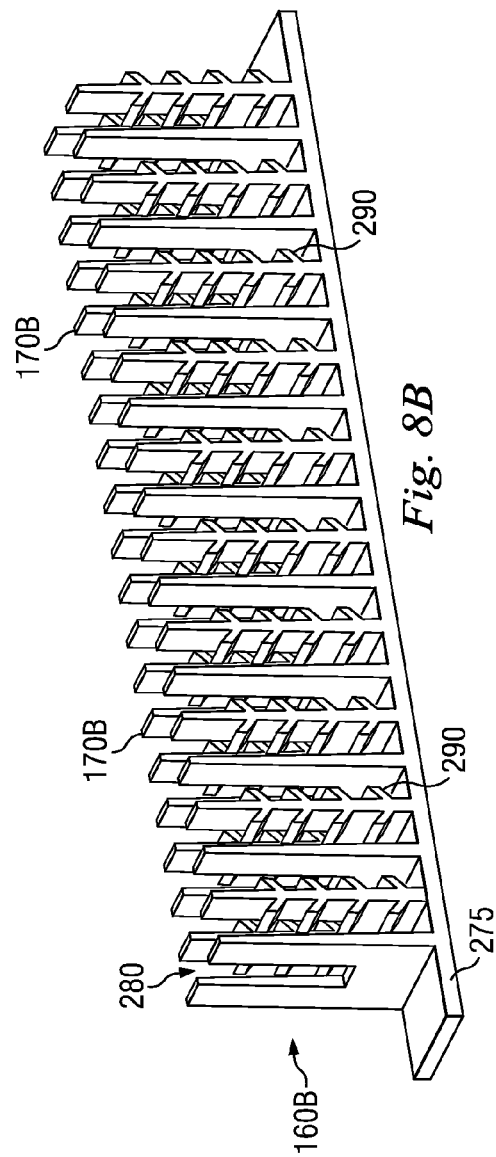

LED LIGHTING APPARATUS WITH FLEXIBLE LIGHT MODULES

PRIORITY DATA

The present application is a continuation application of U.S. patent application Ser. No. 13/326,766, filed on Dec. 15, 2011, entitled "LED Lighting Apparatus with Flexible Light Modules", the disclosure of which is hereby incorporated by reference in its entirety.

TECHNICAL FIELD

The present disclosure relates generally to light-emitting devices, and more particularly, to a flexible light-emitting diode (LED) light module used in LED lamps.

BACKGROUND

LED devices are semiconductor photonic devices that emit light when a voltage is applied. LED devices have increasingly gained popularity due to favorable characteristics such as small device size, long lifetime, efficient energy consumption, and good durability and reliability. In recent years, LED devices have been deployed in various applications, including indicators, light sensors, traffic lights, broadband data transmission, and illumination devices. For example, LED devices are often used in illumination devices provided to replace conventional incandescent light bulbs, such as those used in a typical street lamp. However, traditional LED lamps may suffer from drawbacks such as lack of flexibility, difficult maintenance, incompatibility with certain types of existing street light housings, and unsatisfactory waterproofing capabilities.

Therefore, while existing LED lamps have been generally adequate for their intended purposes, they have not been entirely satisfactory in every aspect. LED lamps that can overcome the shortcomings of traditional LED lamps discussed above continue to be sought.

BRIEF DESCRIPTION OF THE DRAWINGS

Aspects of the present disclosure are best understood from the following detailed description when read with the accompanying figures. It is emphasized that, in accordance with the standard practice in the industry, various features are not necessarily drawn to scale or according to the exact geometries. In fact, the dimensions of the various features may be arbitrarily increased or reduced for clarity of discussion.

FIGS. 2A and 2B are diagrammatic perspective views of some embodiments of an LED light module according to various aspects of the present disclosure.

FIGS. 4A-4C are diagrammatic perspective views of different portions of a lamp head according to various aspects of the present disclosure.

FIGS. 8A and 8B are diagrammatic perspective views of different embodiments of heat sinks according to various aspects of the present disclosure.

DETAILED DESCRIPTION

Figure 1:
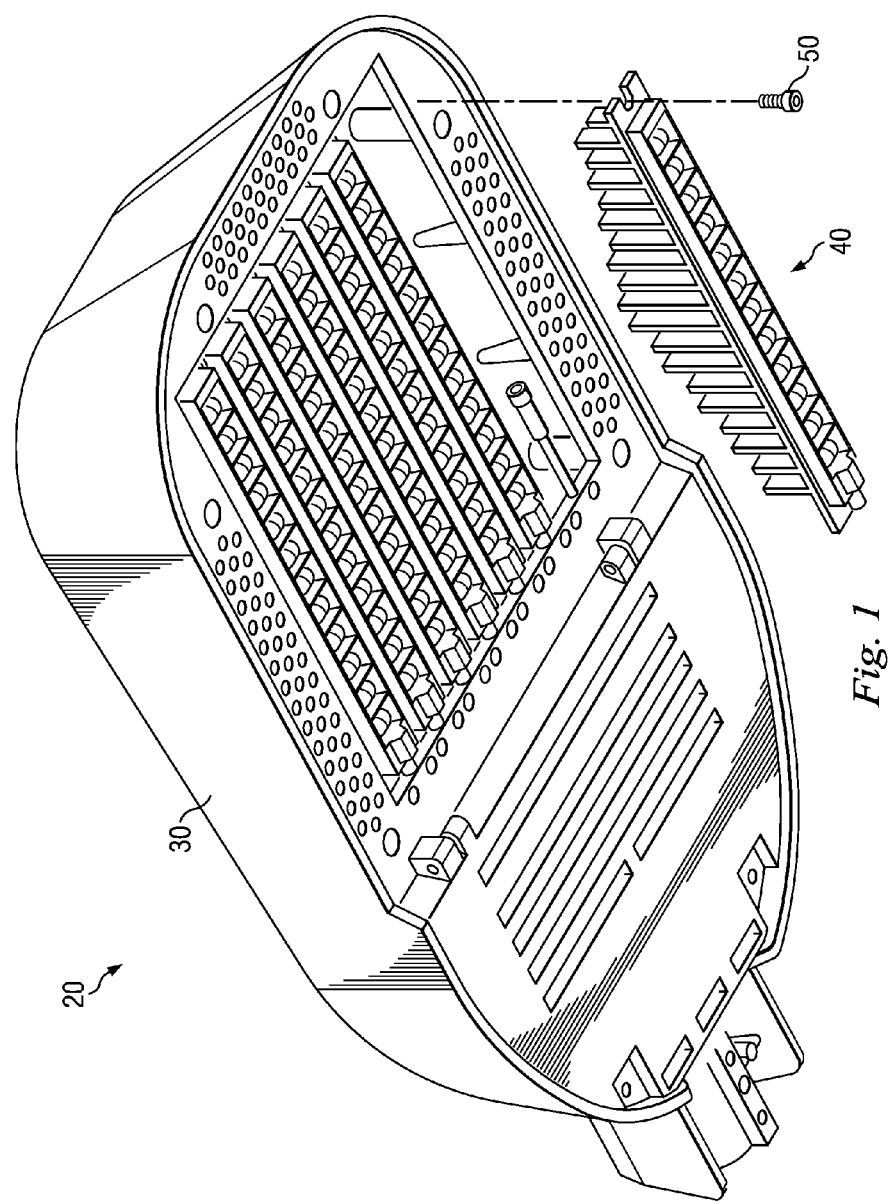
FIG. 1 is a diagrammatic perspective view of an LED lamp head according to various aspects of the present disclosure.

It is understood that the following disclosure provides many different embodiments, or examples, for implementing different features of various embodiments. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. Moreover, the terms "top," "bottom," "under," "over," and the like are used for convenience and are not meant to limit the scope of embodiments to any particular orientation. Various features may also be arbitrarily drawn in different scales for the sake of simplicity and clarity. In addition, the present disclosure may repeat reference numerals and/or letters in the various examples. This repetition is for the purpose of simplicity and clarity and does not in itself necessarily dictate a relationship between the various embodiments and/or configurations discussed.

Semiconductor devices can be used to make photonic devices, such as light-emitting diode (LED) devices. When turned on, LED devices may emit radiation such as different colors of light in a visible spectrum. Compared to traditional light sources (e.g., incandescent light bulbs), lighting instruments using LED devices as light sources offer advantages such as smaller size, lower energy consumption, longer lifetime, variety of available colors, and greater durability and reliability. These advantages, as well as advancements in LED fabrication technologies that have made LED devices cheaper and more robust, have added to the growing popularity of LED-based lighting instruments in recent years. Nevertheless, existing LED lighting instruments may face certain shortcomings. Some of these shortcomings include lack of flexibility, difficulty of maintenance, incompatibility with certain types of existing street light housings, and unsatisfactory waterproofing capabilities.

According to various aspects of the present disclosure, described below is an improved LED lighting instrument 20 that substantially overcomes these shortcomings associated with traditional LED lighting instruments. Referring to FIG. 1, a diagrammatic fragmentary perspective view of a portion of the lighting instrument 20 is illustrated according to some embodiments of the present disclosure. In more detail, the portion of the lighting instrument 20 shown in FIG. 1 is a lamp head of a street light. The lighting instrument 20 includes a lamp head housing 30 and a plurality of light modules 40 that are implemented inside the lamp head housing 30. To provide more clarity, one of such light modules 40 is illustrated separately from the lamp head. The light modules 40 are separate and independent from one another. Each light module 40 can be individually installed within (or taken out of) the lamp head housing 30. In some embodiments, each light module 40 can be secured to the lamp head housing 30 using a screw 50 (or another suitable fastening mechanism). In alternative embodiments, the light modules 40 can be secured to the lamp head housing 30 via screw-free mechanisms, which will be discussed in more detail below with reference to FIGS. 3A-3B and 4A-4C.

FIGS. 2A and 2B are more detailed perspective views of an example light module 40A according to some embodiments. FIG. 2A shows an exploded perspective view of the light module 40A, and FIG. 2B shows an assembled (or integrated) perspective view of the light module 40A. The light module 40A includes a plurality of semiconductor photonic devices, for example LEDs 60, as light sources. Each LED 60 may include a p-type layer and an n-type layer, each of which contains a respective III-V group compound. Each LED 60 may also include a multiple quantum well (MQW) sandwiched between the p-type layer and the n-type layer. The MQW layer includes alternating layers of gallium nitride and indium gallium nitride. The p-type and n-type layers and the MQW layer may be formed by a plurality of epitaxial growth processes. The MQW emits light in response to an electrical voltage applied to the p-type and n-type layers.

The LEDs 60 are located on a substrate 70. In some embodiments, the substrate 70 includes a Metal Core Printed Circuit Board (MCPCB). The MCPCB includes a metal base that may be made of Aluminum (or other alloys). The MCPCB also includes a thermally conductive but electrically insulating dielectric layer disposed on the metal base. The MCPCB may also include a thin metal layer made of copper that is disposed on the dielectric layer. In certain embodiments, the substrate 70 may include other suitable thermally conductive structures. The substrate 70 may contain active circuitry and may also be used to establish interconnections.

The LED 60 each have a primary lens (not illustrated herein) formed thereon. The primary lens may be directly mounted on the LED and may shape the pattern of the light emitted by the LED. In addition, the LEDs 60 are also each covered by a secondary lens 80, which is positioned over the primary lens. The secondary lens 80 works in conjunction with the primary lens to further shape the pattern of the light emitted by the LED 60 into a desired light pattern. The secondary lenses 80 are reconfigurable. For example, the secondary lenses 80 may be replaced by other types of secondary lenses in order to adjust the output light pattern of the LED 60.

The light module 40A also includes a metal cover 90 disposed over the LED 60. The metal cover 90 contains a plurality of openings 100 that are approximately aligned with the plurality of LEDs 60, respectively. Alternatively stated, each LED 60 is disposed within a respective one of the openings 100. In some embodiments, the openings 100 are each defined by sidewalls 110 that collectively form a polygonal structure, for example a rectangle. Each LED 60 is circumferentially surrounded by a respective one of the polygonal structures (i.e., openings).

The secondary lens 80 will be struck on the metal cover 90 by adhesive glue. These polygonal structures of metal cover 90 serve at least two purposes. First, they protect the secondary lens 80 and LED 60 therein from being damaged by external objects. For example, a projectile thrown toward the secondary lens 80 and LED 60 may be deflected by the sidewalls 110 of the metal cover 90, thereby avoiding impact (and the consequent damages) with the secondary lens 80 and LED 60. Second, the polygonal structures surrounding the LED 60 also function as reflector cups for the LED 60. That is, the light emitted by the LED 60 may be reflected by the sidewalls 110 of the metal cover 90 toward a desired direction(s). Without a reflective structure, light may be emitted toward undesired directions, thereby weakening the intensity of the light output in the desired direction. The metal cover 90 is also thermally coupled to the LED 60, and as such can be used to dissipate heat generated by the LED 60.

A cable 120 is coupled to the metal cover 90 through a waterproof connector 130. Wires such as electrical wires may be routed to the light module 40A through the cable 120 and the waterproof connector 130, so that electrical connections may be established between the LED 60 and external devices. The waterproof connector 130 prevents water (or other forms of moisture) from reaching inside the light module 40A.

The substrate 70 on which the LEDs 60 are implemented is disposed on a thermal pad 140. The thermal pad 140 has good thermal conductivity and may include a metal material. In this manner, thermal energy (i.e., heat) generated by the LEDs 60 during operation can be efficiently transferred to the thermal pad 140.

The thermal pad 140 is surrounded and/or sealed by a gasket 150. The gasket 150 is made of a waterproof material to prevent moisture from reaching inside the light module 40A. Thus, the light module 40A is independently waterproof.

The thermal pad 140 is also disposed on a on a thermal dissipation structure 160, also referred to as a heat sink 160. Since the thermal pad 140 has good thermal conductivity, it can transfer the thermal energy generated by the LED 60 to the heat sink 160. The heat sink 160 contains a thermally conductive material, such as a metal material, to facilitate heat dissipation to the ambient atmosphere. To enhance heat transfer, the heat sink 160 also includes a plurality of fins 170 that protrude outwardly from a body of the heat sink 160. The fins 170 may have substantial surface area exposed to ambient atmosphere to maximize the rate of heat transfer. The heat sink 160 (and the fins 170) is discussed below in more detail with reference to FIGS. 8A and 8B.

Though not specifically illustrated in FIGS. 2A-2B for reasons of simplicity, it is understood that one or more fastening mechanisms (e.g., the screw 50 of FIG. 1) may be used to secure the light module 40A to a suitable housing, for example the lamp head housing 30 shown in FIG. 1. Thus, the light module 40A can be easily installed into (or taken off from) the housing. A service technician merely needs to fasten (or release) the screw and the waterproof connector. This allows for easy maintenance of street lights in the field, especially in higher altitude situations above ground.

Figure 3A:
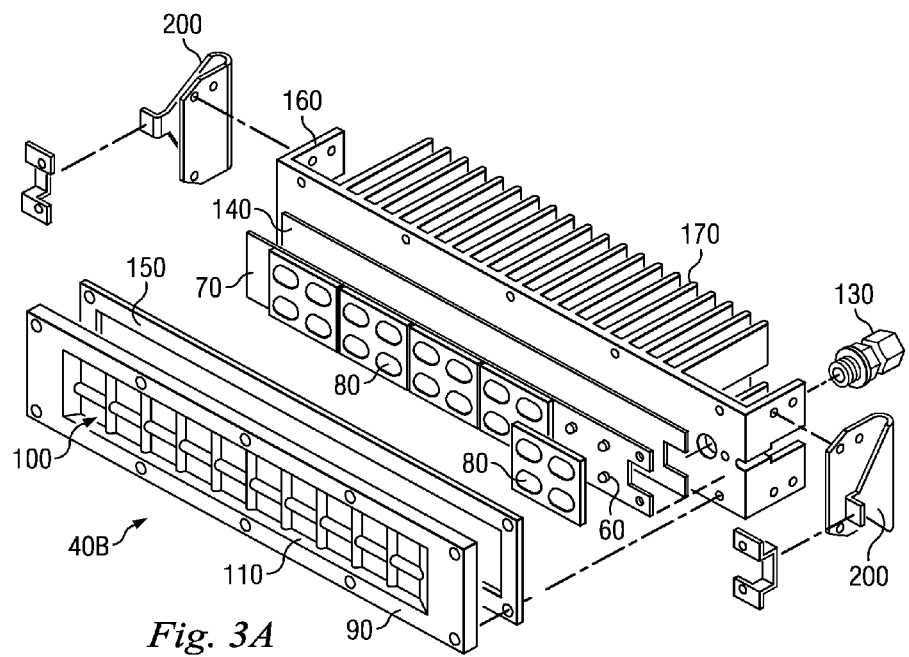
FIGS. 3A and 4B are diagrammatic perspective views of some embodiments of another LED light module according to various aspects of the present disclosure.
Figure 3B:
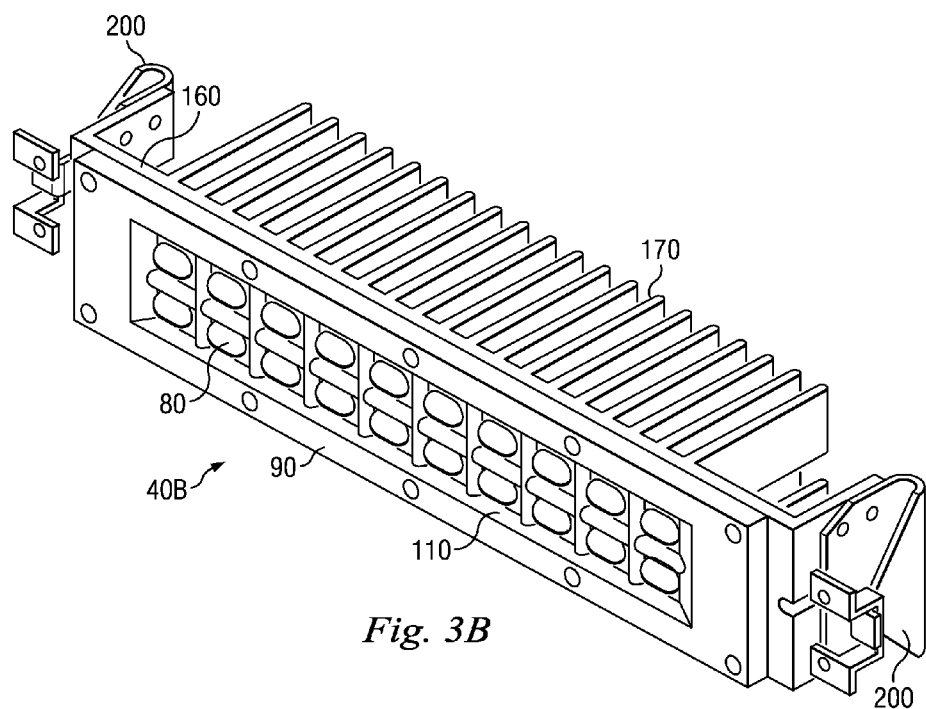

FIGS. 3A and 3B are exploded and assembled perspective views of a light module 40B according to some other embodiments of the present disclosure. The light module 40B has similarities with the light module 40A discussed above with reference to FIGS. 2A-2B. For reasons of clarity and consistency, similar components in both light modules 40A and 40B will be labeled the same herein. For example, the light module 40B includes a plurality of LEDs 60 implemented on a substrate 70. The LEDs 60 are covered by reconfigurable secondary lenses 80. A metal cover 90 containing openings 100 is located over the LED 60, wherein each LED 60 is disposed within one of the openings 100. The LEDs 60 are thermally coupled to a heat sink 160 through a thermal pad 140. The heat sink 160 contains a plurality of fins 170 to facilitate heat dissipation.

Figure 4A:
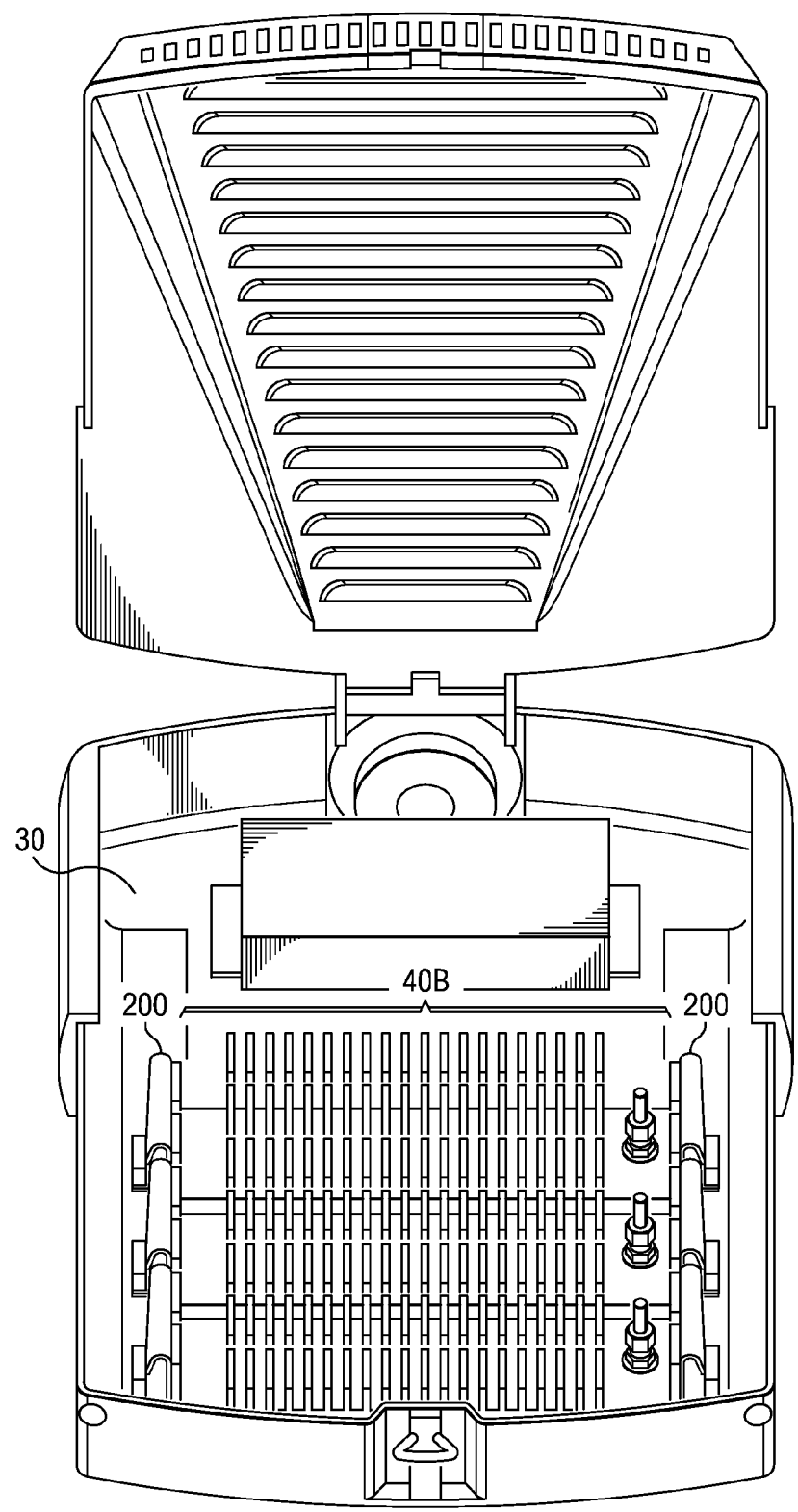
Figure 4B:
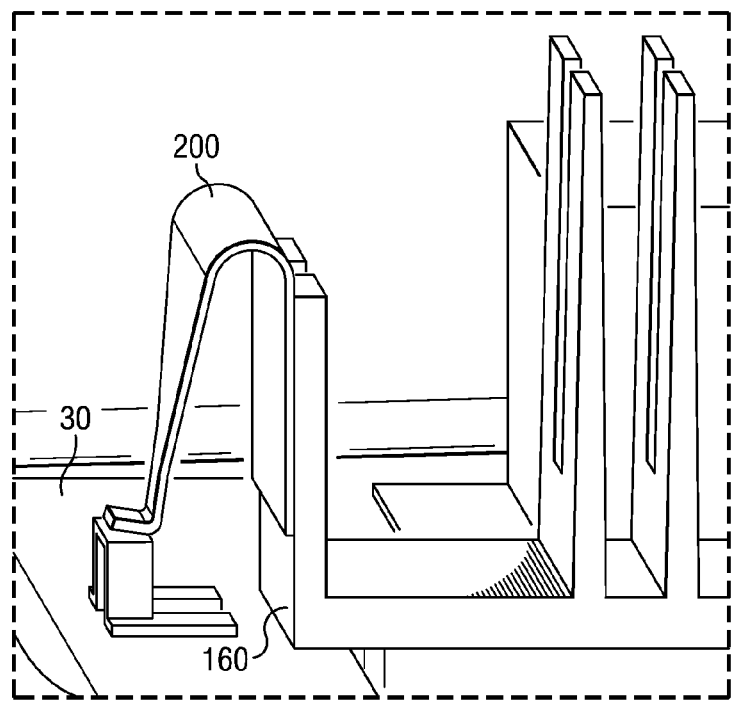
Figure 4C:
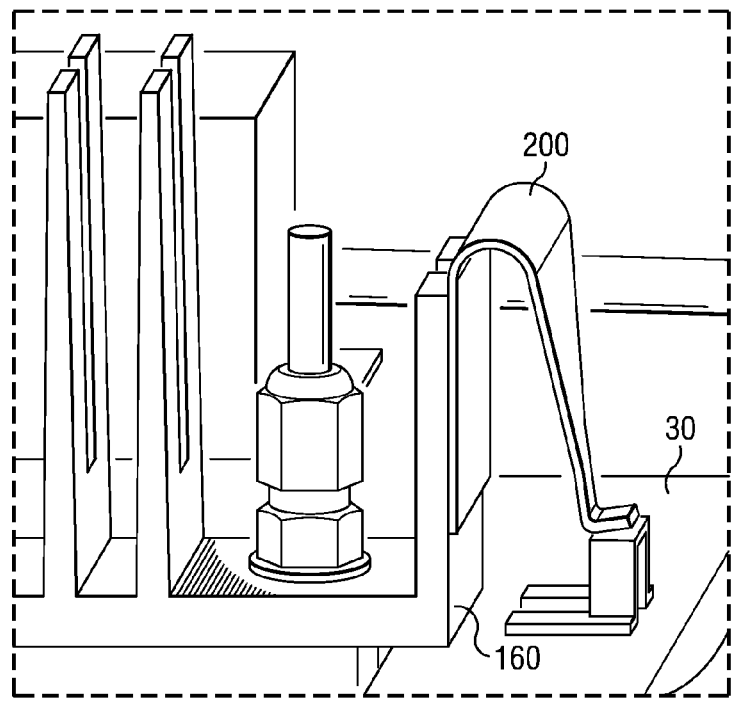

Unlike the light module 40A, the light module 40B employs one or more screw-free mechanism 200 to secure the light module 40B to a suitable housing, for example the lamp head housing 30 shown in FIG. 1. In some embodiments, the screw-free mechanisms 200 include metal tenons (thereafter referred to as metal tenons 200), which allow the light module 40B to be secured to the housing 30 by a springing force. FIGS. 4A-4C illustrate the metal tenons 200 from different perspectives in more detail. As is shown, a portion of the metal tenons 200 may be in physical contact with side walls of the heat sink 160. Another portion of the metal tenons 200 may be in physical contact with the housing 30. A springing force of the metal tenons 200 secures the heat sink 160 (and therefore the light module 40B) to the housing 30. In other words, the light module 40B may be effectively clamped to the housing 30 through the springing force.

Thus, to install the light module 40B into the housing 30, the service technician simply needs to position the light module 40B and the metal tenons 200 until the metal tenons can be "clamped in" or "clamped down." On the other hand, to release the light module 40B from the housing 30, the service technician simply needs to unclamp the metal tenons 200. The service technician does not need to carry any tools such as wrenches or screwdrivers with him. Such design further simplifies the maintenance process. In some alternative embodiments, the screw-free mechanism 200 may include clampers (e.g., on one of the side fins 170 of the heat sink 160), or a slide groove and a fix pin.

Referring back to FIGS. 3A-3B, another difference between the light modules 40A and 40B is that the plurality of LEDs 60 in the light module 40A is arranged in a single row of vertically-oriented array, whereas the plurality of LEDs 60 in the light module 40B is arranged in two rows of horizontally-oriented arrays. Other arrangements are envisioned in alternative embodiments. A light module may employ any suitable arrange configurations of LED depending on factors such as desired light pattern, light density, available space, and/or costs.

Figure 5:
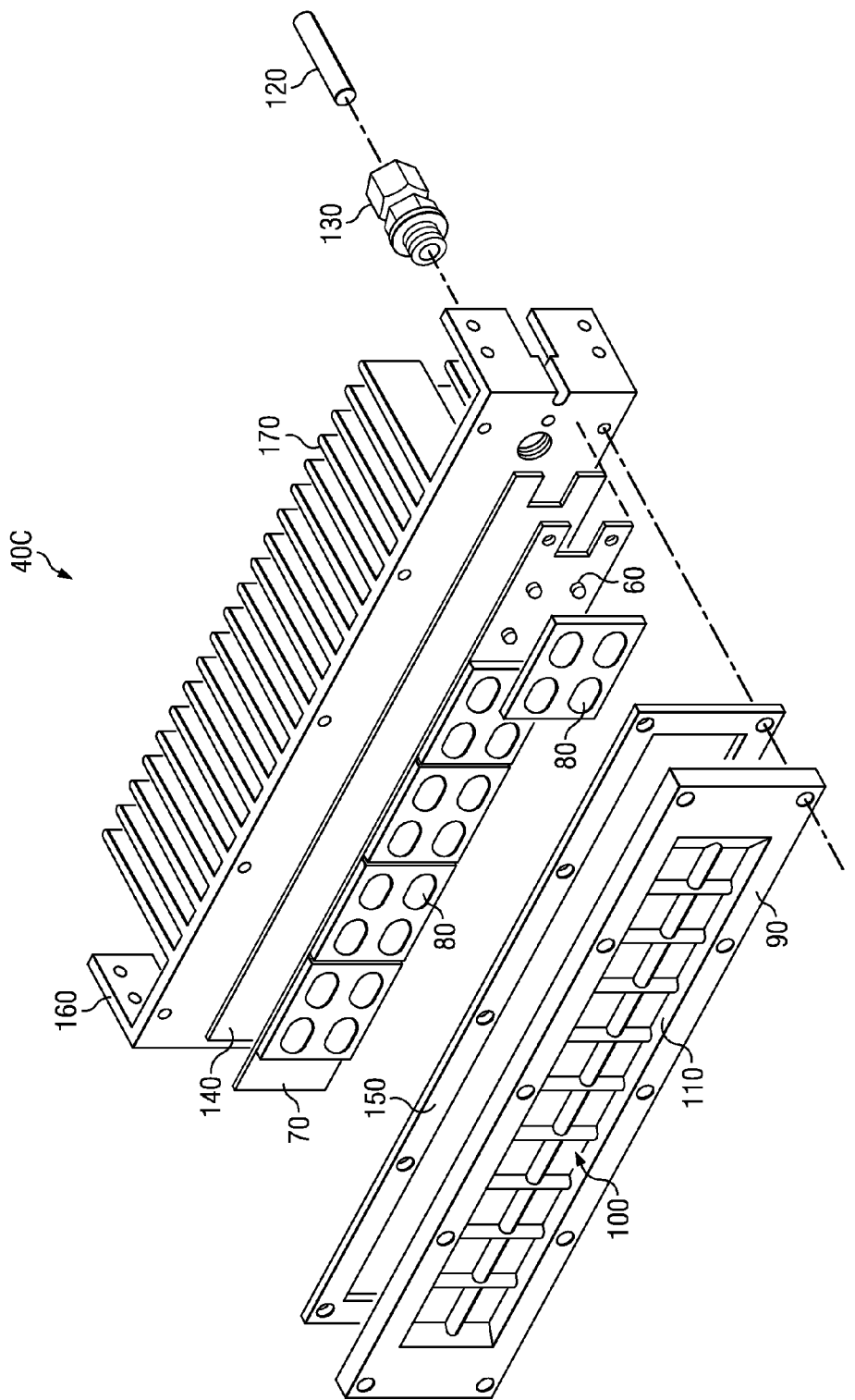
FIG. 5 is a diagrammatic perspective view of some embodiments of yet another LED light module according to various aspects of the present disclosure.

FIG. 5 is an exploded perspective view of a light module 40C according to some other embodiments of the present disclosure. The light module 40C has similarities with the light modules 40A and 40B discussed above with reference to FIGS. 2A-2B and 3A-3B. For reasons of clarity and consistency, similar components in all of the light modules 40A-40C will be labeled the same herein. For example, the light module 40C includes a plurality of LEDs 60 implemented on a substrate 70. The LEDs 60 are covered by reconfigurable secondary lenses 80. A metal cover 90 containing openings 100 is located over the LEDs 60, wherein each LED 60 is disposed within one of the openings 100. The LEDs 60 are thermally coupled to a heat sink 160 through a thermal pad 140. The heat sink 160 contains a plurality of fins 170 to facilitate heat dissipation. Similar to the light module 40B, the light module 40C has two rows of horizontally-oriented arrays of LEDs 60. And similar to the light module 40A, the light module 40C uses screws (rather than a screw-free mechanism) to secure itself to a housing. Thus, the light module 40C may be considered a combination of the light modules 40A and 40B.

Figure 6A:
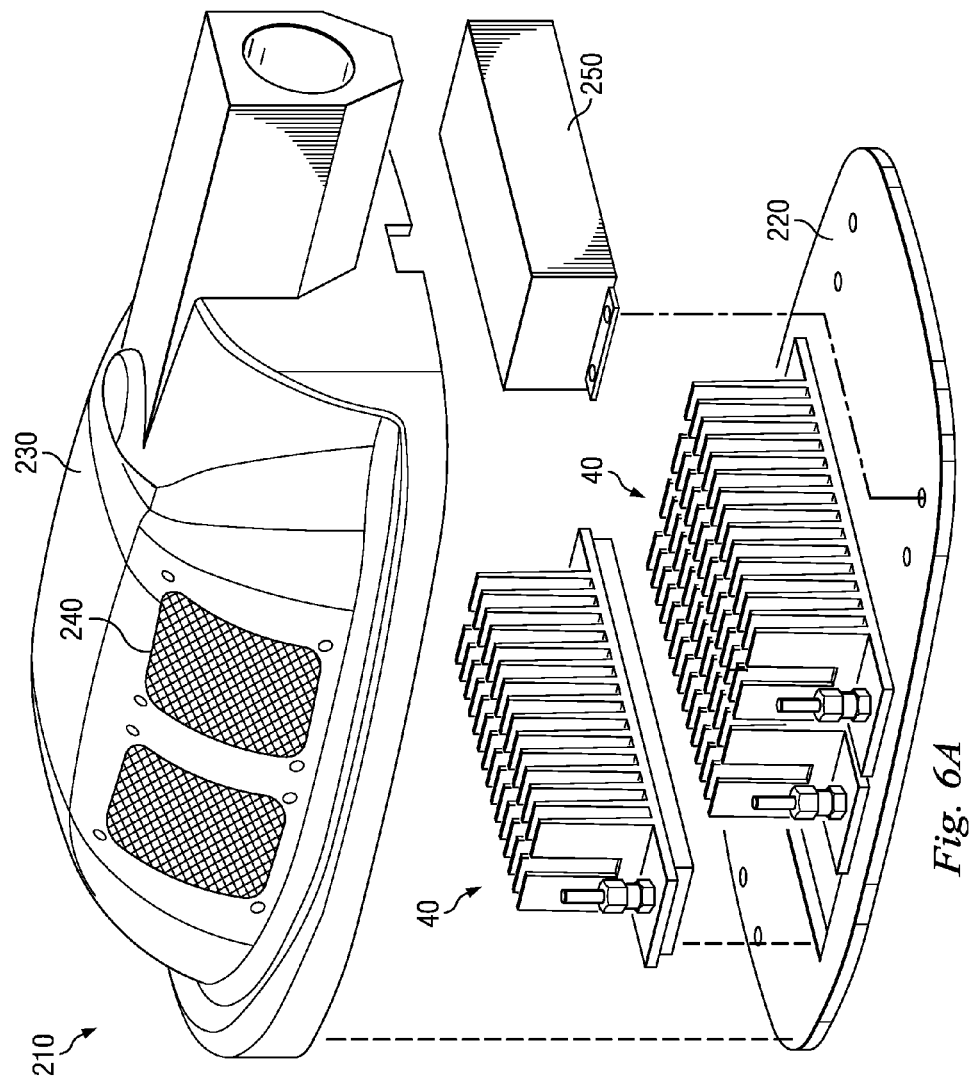
FIGS. 6A-6C are diagrammatic perspective views of a lamp head and its various components according to various aspects of the present disclosure.
Figure 6B:
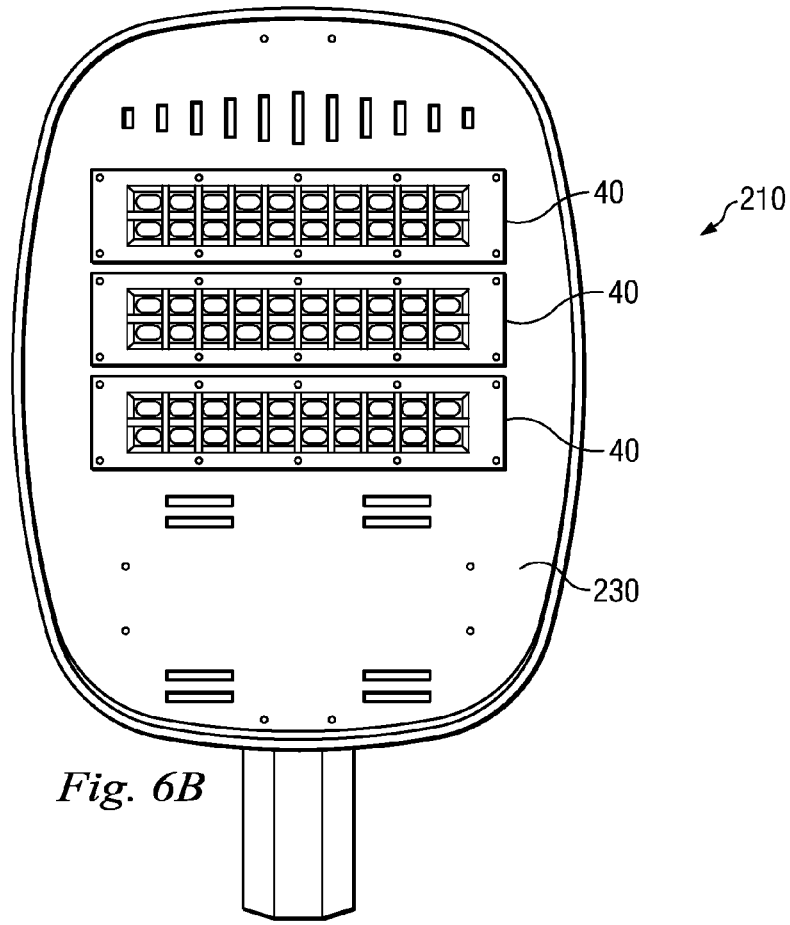
Figure 6C:
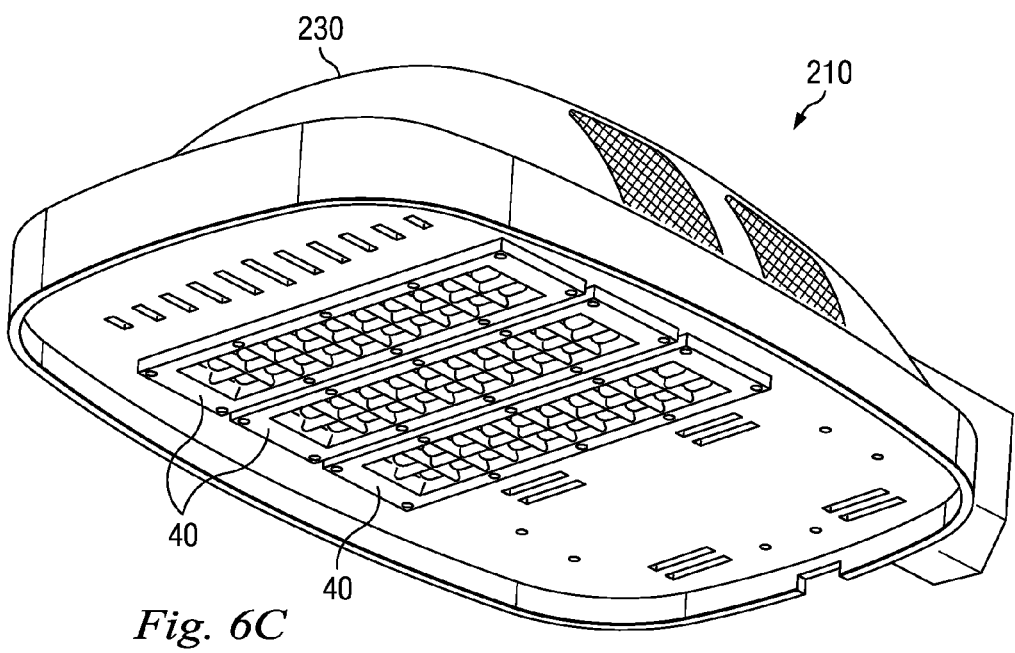

FIGS. 6A-6C illustrate embodiments of a lamp head 210 within which the light modules 40A, 40B, or 40C may be implemented. In more detail, FIG. 6A is an exploded perspective view of different components of the lamp head 210, FIG. 6B is a top view of the lamp head 210, and FIG. 6C is a perspective view of the lamp head 210. The lamp head 210 may be considered an embodiment of the lighting instrument 20 of FIG. 1.

The lamp head 210 includes a fixture 220, which may be a board or a plate. In some embodiments, the fixture 220 includes a thermally conductive material such as metal. A plurality of light modules 40 are attached to the fixture 220, either through screws or a screw-free mechanism discussed above. A housing structure 230 provides cover for the light modules 40. The fixture 220 and the housing structure 230 collectively at least partially enclose the light modules 40 therein. The fixture 220 may be considered a part of the housing structure 230. In some embodiments, the housing structure 230 is a cobra head housing for tradition street lighting. The cobra head housing may have a shape resembling the head of a cobra. Other types of street lighting housing structures may be used in alternative embodiments. The housing structure 230 may also include a perforated plate 240 for better air ventilation, so as to optimize heat dissipation. The lamp head 210 may also contain a power module 250, which is also housed within the housing structure 230. The power module 250 may include electrical power circuitry for providing and/or routing electrical power to the light modules 40.

Figure 7:
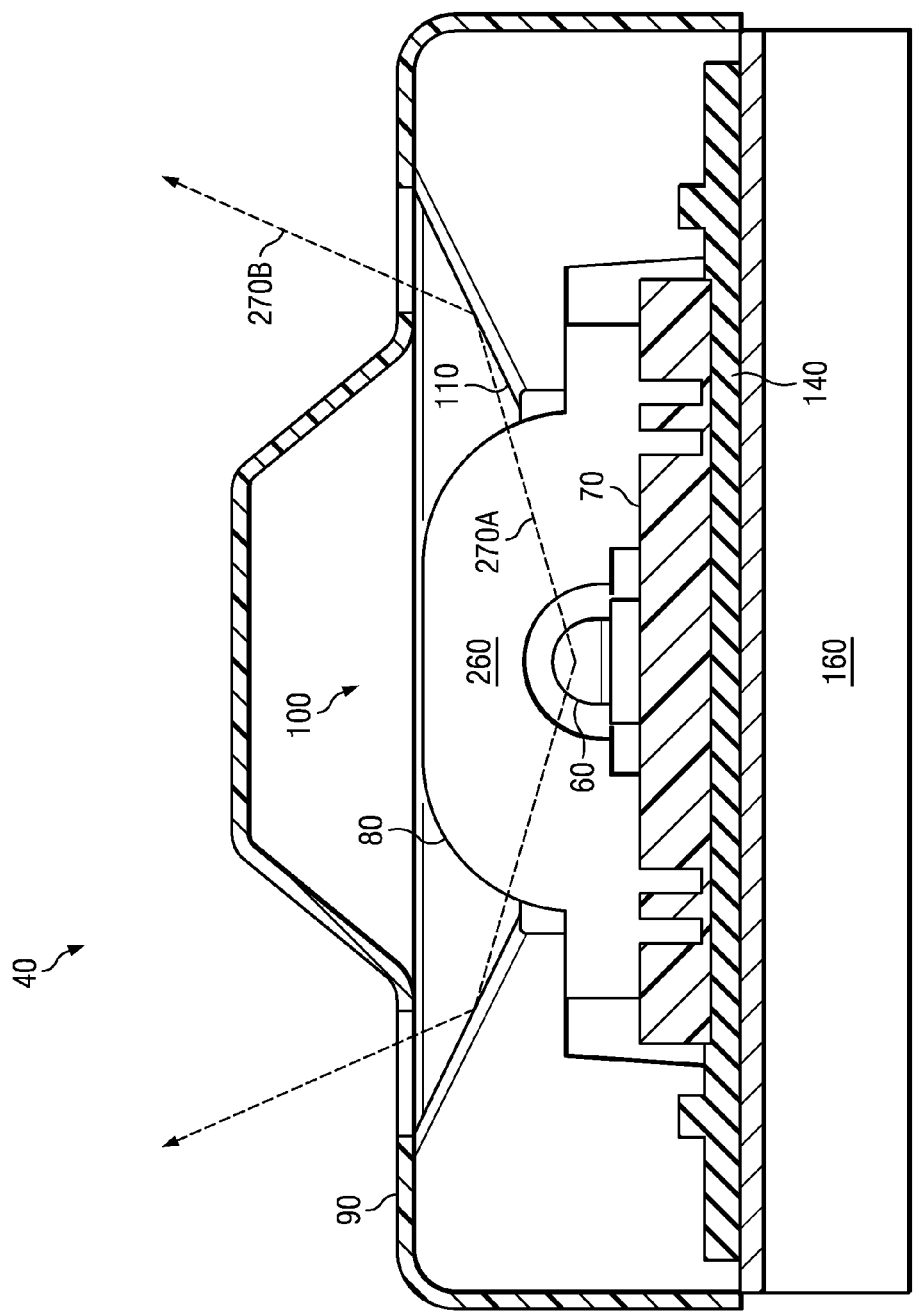
FIG. 7 is a diagrammatic cross-sectional side view of an LED light module according to various aspects of the present disclosure.

FIG. 7 is a diagrammatic fragmentary cross-sectional side view of the light module 40 according to some embodiments. The light module 40 contains an LED 60 that emits light. The LED is disposed on a substrate 70, which is thermally coupled to a heat sink 160 through a thermal pad 140. A secondary lens 80 is disposed above the LED 60 and shapes the light pattern emitted by the LED 60. An optical glue 260 fills the space between the LED 60 and the secondary lens 80. A metal cover 90 is disposed above the secondary lens 80 and protects the lens 80 and the LED 60 from external impact. The metal cover 90 includes an opening 100 aligned with the lens 80 or the LED 60. Alternatively stated, the lens 80 and the LED 60 are disposed within the opening 100. The opening 100 is defined by sidewalls 110. The sidewalls 110 are operable to reflect light, for example reflecting light 270A emitted by the LED 60 as light 270B. Since the sidewalls 110 of the metal cover 90 can be used as reflective structures, no additional reflective structures need to be implemented, thereby saving fabrication costs.

FIGS. 8A and 8B are diagrammatic perspective views of different embodiments of the heat sink 160. Referring to FIG. 8A, the heat sink 160A includes a main body 275 and a plurality of fins 170A protruding outwards from the main body 275. The fins 170A each have a recess 280. In other words, the fins 170A are each approximately "U-shaped." The recesses 280 may be approximately aligned with one another, so that an air flow path is formed by the aligned recesses 280 collectively. In this manner, air flow in the heat sink 160 is enhanced, thus further increasing heat dissipation efficiency.

Referring to FIG. 8B, the heat sink 160B includes a plurality of fins 170B protruding outwards from the main body 275. The fins 170B also each have a recess 280. The fins 170B are also approximately "U-shaped" and aligned with one another. Therefore, similar to the heat sink 160A, the heat sink 160B also has enhanced heat dissipation characteristics due to better air flow. In addition, the fins 170B of the heat sink 160B each include a plurality of outwardly-protruding branches 290. These branches 290 further increase heat dissipation efficiency of the heat sink 160B, since they keep the same air flow rate and add additional exposure area to the heat sink 160B.

Figure 9:
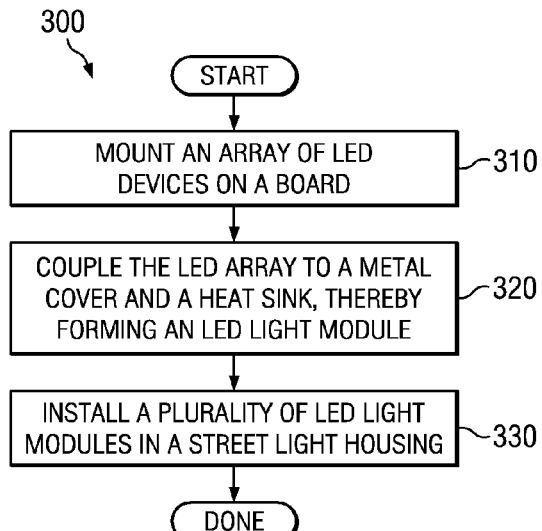
FIG. 9 is a flowchart illustrating a method of fabricating a lighting apparatus using a semiconductor photonic device as a light source according to various aspects of the present disclosure.

FIG. 9 is a flowchart of a method 300 for fabricating a lighting apparatus using a semiconductor photonic device as a light source according to various aspects of the present disclosure. The method 300 includes a block 310, in which an LED array contains a plurality of LEDs are mounted on a board. In some embodiments, the board includes a MCPCB board, and the LEDs are each covered by a reconfigurable secondary lens. The method 300 includes a block 320, in which the LED array is coupled to a metal cover and a heat sink, thereby forming an LED light module. The metal cover includes a plurality of openings surrounding the LEDs, respectively. The openings are defined by reflective sidewalls of the metal cover. The sidewalls are operable to reflect light emitted by the LED. The heat sink has a plurality of fins that each have a recess therein. The recesses allow better air flow within the heat sink. The heat sink is operable to dissipate heat generated by the LEDs. The method 300 includes a block 330, in which a plurality of LED light modules is installed in a street light housing. The LED light modules are separate and independent from each other. Each of the LED light modules has independent waterproofing capabilities. The street light housing may include cobra head housing in some embodiments.

Additional processes may be performed before, during, or after the blocks 310-330 discussed herein to complete the fabrication of the lighting apparatus. For the sake of simplicity, these additional processes are not discussed herein.

The lighting instrument 20 according to the embodiments disclosed herein offers advantages over existing semiconductor-based lighting products. It is understood, however, that not all advantages are necessarily discussed herein, and different embodiments may offer additional advantages, and that no particular advantage is necessarily required for all embodiments.

One advantage of the embodiments disclosed herein is the light modules allow for easy installation and maintenance. Traditional LED lamps usually involve a set of LEDs mounted on a single printed circuit board. Thus, the entire board may need to be taken out of the housing to repair a single component, which is cumbersome and costly. In comparison, the embodiments of the present disclosure allow multiple separate and independent LED light modules to be installed into a lamp head housing. The installation of the light modules is easy because it merely involves securing each module to the housing via a screw, or a screw-free mechanism in some embodiments. Servicing is made simpler as well, since if a component on a single light module needs to be repaired or replaced, only that light module needs to be taken out of the housing. To carry out the installation and servicing tasks, a technician needs only basic tools (e.g., wrench or screwdriver) or no tools at all. The simple installation and maintenance of the light modules is particularly advantageous in embodiments where the light modules are installed in street lights, because servicing the street lights typically involves high altitude operations. Thus, the easier and faster the installation and maintenance, the safer it is.

Another advantage of the embodiments disclosed herein is the enhanced thermal dissipation capabilities of the LED light modules. In some embodiments, the aligned recesses of the fins of the heat sink allow for better air flow, which increases the rate of heat dissipation. In some other embodiments, the fins of the heat sink also have protruding branches, which allows for better thermal convection and may reduce junction temperature. The metal cover also enables bidirectional heat dissipation, that is, the heat can be dissipated in one direction through the heat sink, as well as being dissipated in the opposite direction through the metal cover. Such bidirectional heat dissipation helps prevent ice buildup on the front side of the lamp in cold weather, since by dissipating the heat, the metal cover can melt ice or snow deposited on the metal cover or in its surrounding areas.

Yet another advantage of the embodiments disclosed herein is the improved optical design. For example, the secondary lens in conjunction with the primary lens can flexibly shape the light profile of the LED. The optical glue implemented between the secondary lens and the LED further increases the light output efficiency to as much as 100%. Furthermore, the fact that the metal cover can be used as light reflectors obviate the need to implement additional light reflectors, thereby simplifying lamp design and reducing fabrication costs.

Another advantage is attributed to the independent waterproofing capabilities for each LED light module, which reduces overall system failure risks. One more advantage pertains to the compatibility of the LED light modules with the cobra head street light housing, which is difficult to achieve for traditional LED lamps.

Figure 10:
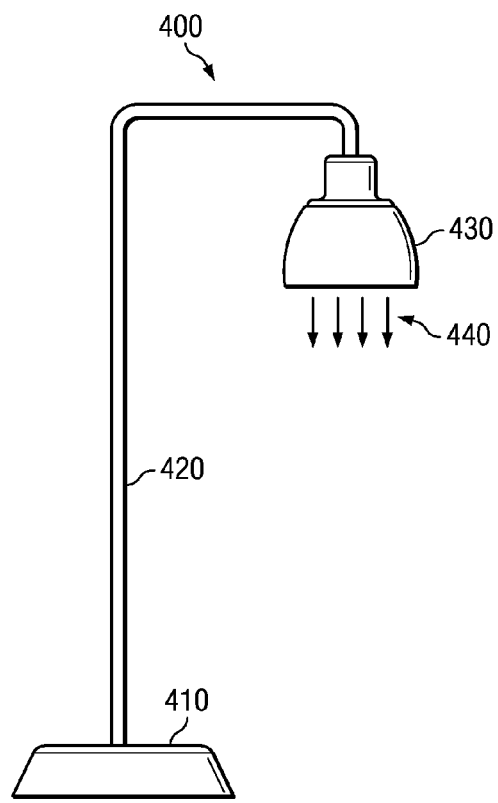
FIG. 10 is a diagrammatic view of a street light that includes the LED light modules of FIGS. 1-9 according to various aspects of the present disclosure.

FIG. 10 illustrates a simplified diagrammatic view of a lighting apparatus 400 that includes some embodiments of the lighting instrument 20 discussed above. In some embodiments, the lighting apparatus 400 is a street light. The lighting apparatus 400 has a base 410, a body 420 (or post) attached to the base 410, and a lamp head 430 attached to the body 420. In some embodiments, the lamp head 430 includes a cobra head lamp. Light 440 is emitted from the lamp head 430.

The lamp head 430 includes the lighting instrument 20 discussed above with reference to FIGS. 1-9. In other words, the lamp head 430 of the lighting apparatus 400 includes a plurality of flexible light modules that can be separately and independently installed in a lamp head housing. Due at least in part to the advantages discussed above, the LED lamp head 430 allows for flexible installation and maintenance and better performance.

One of the broader forms of the present disclosure involves a light module. The light module includes: an array of light illuminating devices disposed on a substrate, wherein each of the light illuminating devices in the array includes a semiconductor photonic device covered by a lens; a metal cover having a plurality of openings, wherein each of the light illuminating devices is disposed within a respective one of the openings; and a heat sink thermally coupled to the substrate.

In some embodiments, the substrate includes a thermally conductive pad; the photonic device includes a light-emitting diode (LED); and the lens includes a secondary lens.

In some embodiments, the secondary lens is reconfigurable.

In some embodiments, the light module is waterproof.

In some embodiments, the light module includes: a waterproof gasket disposed between the substrate and the heat sink; and one or more waterproof connectors coupled to the metal cover.

In some embodiments, the openings of the metal cover are configured as light reflectors for their respective semiconductor photonic devices.

In some embodiments, the heat sink includes a plurality of fins that each contain a respective recess; and the recesses are approximately aligned.

In some embodiments, each fin has a plurality of protruding branch members.

In some embodiments, a plurality of the light modules is operable to be installed within a housing for a cobra head light.

Another one of the broader forms of the present disclosure involves a lighting instrument. The lighting instrument includes: a street light housing; and a plurality of lighting modules and power supply disposed within the street light housing, wherein each of the lighting modules includes: a thermally conductive substrate; a plurality of light-emitting diode (LED) devices located on the substrate; a metal cover disposed over the substrate, wherein the metal cover includes a plurality of openings that are each aligned with a respective one of the LED devices; and a thermal dissipation structure coupled to the substrate.

In some embodiments, the LED devices each include an LED covered by a reconfigurable secondary lens.

In some embodiments, each lighting module includes one or more waterproof components.

In some embodiments, the waterproof components include a waterproof connector and a waterproof gasket.

In some embodiments, each lighting module is secured to the housing through a screw-free mechanism.

In some embodiments, each opening of the metal cover is defined by reflective sidewalls surrounding the respective LED device.

In some embodiments, the thermal dissipation structure includes a board and a plurality of members protruding from the board, and wherein the members contain respective recesses that are substantially aligned with one another.

In some embodiments, the members each include a plurality of branches that extend outwardly from the member.

Still another one of the broader forms of the present disclosure involves a street light. The street light includes: a base; a lamp post coupled to the base; a lamp head coupled to the lamp post, wherein the lamp head includes: a housing; a power module; and a plurality of light modules and power supply disposed within the housing, wherein each lighting module includes a plurality of light-emitting diode (LED), a heat sink thermally coupled to the LED, and a thermally conductive cover having a plurality of openings each aligned with a respective one of the LED.

In some embodiments, each light module includes a plurality of reconfigurable secondary lenses that each cover a respective one of the LED; and each opening of the cover is defined by sidewalls that reflect light emitted by the respective LED.

In some embodiments, each of the light modules is independently waterproof.

In some embodiments, the heat sink includes a plurality of fins having recesses therein, and wherein the recesses are approximately aligned with one another.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A light module, comprising:
an array of light illuminating devices disposed on a substrate and collectively extending in a first direction, wherein each of the light illuminating devices in the array includes a semiconductor photonic device covered by a lens;
a metal cover having a plurality of openings, wherein each of the light illuminating devices is disposed within a respective one of the openings; and
a heat sink thermally coupled to the substrate;
wherein:
the heat sink includes a plurality of fins that each contain a respective recess;
the recesses are approximately aligned and collectively form an airflow path that extends in the first direction; and
at least some of the plurality of fins have a plurality of protruding branch members and are alternately arranged in the first direction.

2. The light module of claim 1, wherein:
the substrate includes a thermally conductive pad;
the photonic device include a light-emitting diode (LED); and
the lens includes a secondary lens.

3. The light module of claim 2, wherein the secondary lens is reconfigurable.

4. The light module of claim 1, wherein the light module is waterproof.

5. The light module of claim 1, wherein the light module includes:
a waterproof gasket disposed between the substrate and the heat sink; and
one or more waterproof connectors coupled to the metal cover.

6. The light module of claim 1, wherein the openings of the metal cover are configured as light reflectors for their respective semiconductor photonic devices.

7. The light module of claim 1, wherein each of the plurality of fins has a U-shape profile, and has a plurality of protruding branch members.

8. The light module of claim 1, wherein a plurality of the light modules is operable to be installed within a housing for a cobra head light.

9. A light module, comprising:
a plurality of photonic devices disposed on a substrate;
a plurality of lenses that are each disposed over a respective one of the photonic devices;
a cover that is coupled to the substrate, wherein the cover includes a plurality of openings that each expose a respective one of the lenses; and
a thermally conductive structure coupled to the substrate, wherein the thermally conductive structure includes a plurality of U-shaped fins,
wherein at least some of the plurality of fins have a plurality of protruding branch members and are alternately arranged in a first direction.

10. The light module of claim 9, wherein:
the photonic devices include light-emitting diodes (LEDs); and
the lenses each include a reconfigurable secondary lens.

11. The light module of claim 9, wherein the light module includes:

a waterproof gasket disposed between the substrate and the thermally conductive structure; and a waterproof connector coupled to the cover.

12. The light module of claim 9, wherein the substrate and the cover each contain metal.

13. The light module of claim 9, wherein the openings of the cover are at least partially defined by sidewalls that reflect light emitted from the photonic devices.

14. The light module of claim 9, wherein:
the plurality of photonic devices are aligned in a first direction; and
the U-shaped fins collectively define an airflow path that extends in the first direction.

15. The light module of claim 9, wherein a plurality of the light modules are configured to be individually installed within a cobra headlight housing in a manner such that each of the light modules border an adjacent one of the light modules in a second direction, wherein the second direction is perpendicular to the first direction.

16. The light module of claim 9, wherein each of the light modules is configured to be installed within a cobra headlight housing via a springing mechanism.

17. A light module, comprising:
a plurality of light-emitting diodes (LEDs) disposed on a first side of a thermally conductive substrate, wherein the LEDs are aligned in a first direction;
a plurality of reconfigurable lenses that are each disposed over a respective one of the LEDs;
a cover that is coupled to the first side of the substrate, wherein the cover includes a plurality of openings that each expose a respective one of the lenses, and wherein the openings of the cover are at least partially defined by light-reflective sidewalls; and
a heat sink coupled to a second side of the substrate, the second side being opposite the first side, wherein the heat sink includes a plurality of protruding members that each contain a recess, and wherein each recess is aligned with recesses of other protruding members in the first direction,
wherein at least some of the plurality of protruding members have a plurality of protruding branch members and are alternately arranged in the first direction.

18. The light module of claim 17, wherein the light module includes:
a waterproof gasket disposed between the substrate and the heat sink; and
a waterproof connector coupled to the cover.

19. The light module of claim 17, wherein the light module is configured to be detachably coupled to a cobra headlight housing in a screw-free manner.

20. The light module of claim 17, wherein the lenses include secondary lenses.

* * * * *